United States Patent [19]
Rossler

[11] 3,813,202
[45] May 28, 1974

[54] AUTOMATIC PRODUCTION PLANT FOR FORMING WORKPIECES

[75] Inventor: Willi Rossler, Ersigen, Switzerland

[73] Assignee: Tonwarem-und Porzellanfabrik Rossler A.G., Ersigen, Canton of Berne, Switzerland

[22] Filed: Dec. 13, 1972

[21] Appl. No.: 314,501

[30] Foreign Application Priority Data
Dec. 27, 1971 Switzerland................... 18952/71

[52] U.S. Cl................. 425/404, 425/305, 425/307, 425/422
[51] Int. Cl............................................. B28b 11/00
[58] Field of Search .......... 425/404, 406, 412, 422, 425/289, 301, 305, 307

[56] References Cited
UNITED STATES PATENTS

| | | | |
|---|---|---|---|
| 2,103,086 | 12/1937 | Miller | 425/404 X |
| 2,647,295 | 8/1953 | Gould | 425/404 X |
| 3,462,810 | 8/1969 | Matsushima | 425/404 X |
| 3,528,143 | 9/1970 | Beneke | 425/404 X |
| 3,540,093 | 11/1970 | Boatright, Jr. et al. | 425/404 X |

*Primary Examiner*—Charles W. Lanham
*Assistant Examiner*—Victor A. DiPalma
*Attorney, Agent, or Firm*—Imirie and Smiley

[57] ABSTRACT

A production plant for manufacturing workpieces, preferably hollow work pieces of ceramics or other material comprising an automatically fed centrifugal mixer, an automatic feeding device consisting of a conveyor-band in feeding relation with said centrifugal mixer, at least one extruder-press with an associated storage bunker, an automatic press-charging equipment following said extruder-press, a press after said press-charging equipment to receive a blank from said equipment and to form the completed workpiece, a sequence-controlled delivery device following said press, a rocker-drier, an automatically controlled transfer station between said press and said delivery device arranged to bring the formed workpieces form said press to said rocker-drier, the improvement of providing means to render the production entirely automatic from the feed of the raw material up to the finished product.

3 Claims, 6 Drawing Figures

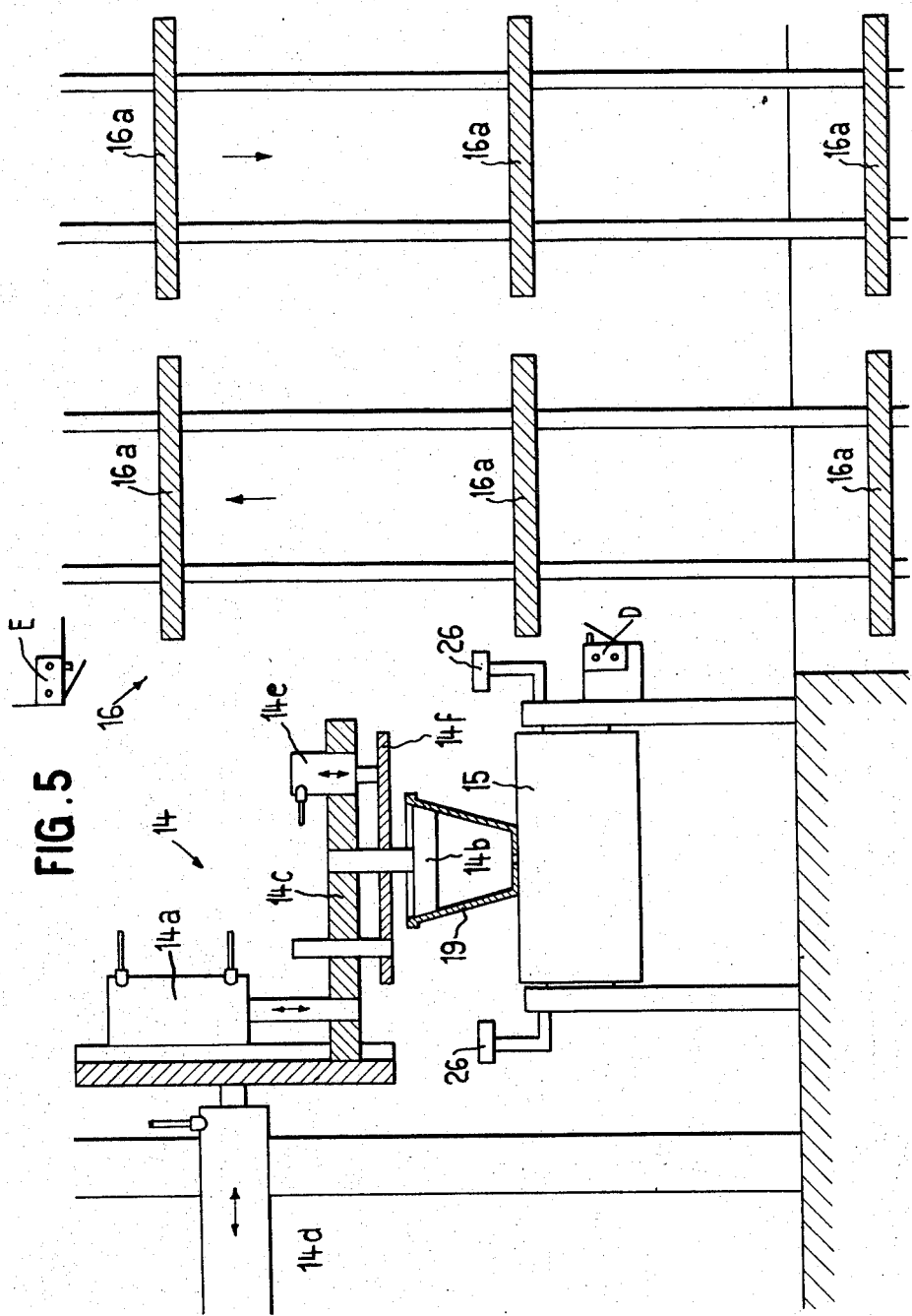

AUTOMATIC PRODUCTION PLANT FOR FORMING WORKPIECES

The invention concerns an automatic production plant for forming workpieces, preferably hollow workpieces, for instance, of ceramics. The plant comprises an automatically fed centrifugal mixer, an automatic feeding device consisting of a convey or-band in feeding relation with said centrifugal mixer, at least one extruder-press with an associated storage bunker, an automatic press-charging equipment following said extruder-press, a press after said press-charging equipment to receive a blank from said equipment and to form the completed workpiece, a sequence-controlled delivery device following said press, a rocker-drier, an automatically controlled transfer station between said press and said delivery device arranged to bring the formed workpieces from said press to said rocker-drier.

Certain parts of such plants, such as for instance the centrifugal mixers, the extruder- or vacuum presses, as well as the forming presses themselves, as well the rocker driers and the conveyer-bands for transporting the material are known in the trade. It has also already been tried to replace certain hand-executed operations in the known manufacture of ceramic formed bodies by automatic control. In this respect a press with an automatic delivery device for the workpieces has become known, which is published in "Silikat-Journal 7 (1968), No. 6."

This known delivery device is a suitable attempt to make an operation automatic which in the manufacture of ceramic formed workpieces influences the productivity in an essential manner, which, however, does in very many respects not fulfil the expectations and does not allow to render the manufacture, beginning with the raw material, completely automatic.

It is an aim of this invention to render automatic all the working operations in the manufacture of ceramic and other formed bodies, and that, beginning with the feeding of the mixer and ending in the pre-dried completed workpiece.

It is another object of the invention to design the production plant in such a way that in several forming presses workpieces of different kinds can be manufactured at the same time, the quality of the products being at least equal to that of products made by hitherto known methods.

Another aim of the invention is to increase the production capacity with a considerably reduced staff of workers.

To fulfil all these requirements the plant according to the invention is characterised by the improvement that both conveyer-bands for feeding the necessary material to be treated to said storage bunkers of said extruder-press and a return-transport-band for returning material in excess are provided, a flap to automatically control the quantity of the material fed into said storage bunker, means to give the blank formed by said extruder-press a predetermined length, a sequence-controlled band arranged to move step by step, a tipping device for receiving said blank from said extruder-press, means to operate said tipping device for transporting said blank onto said sequence-controlled band, said automatic press-charging equipment arranged at the end of said sequence-controlled band to receive a part of the blank on said band, a cutting device in front of said press-charging equipment to cut the blank part in said equipment away from the blank part remaining on said band, said press after said press-charging equipment having an upper part and a lower part movable relatively to each other to be opened or closed, control means to operate the press-charging equipment for moving the cut-away blank part into said lower press-part on said press being open, control means to close said press to form said workpiece and to feed material in excess onto said return-transport band, a transport band movable step by step, a delivery device in cooperation with said press to receive the completed workpieces from the opend press to bring them onto said transport-band movable step by step, and a transfer station between said transport-band and said continuously movable rocker-drier to bring the completed workpiece from said transport-band to said rocker-drier.

In order to strain the rocker-driers to the utmost limit of capacity in a special embodiment of the plant, the transfer station may be so designed that it receives the workpieces fed step by step by means of the band or bands not only singly but in several groups, the station being controlled by a light barrier.

Other objects and features will be apparent as the following description of an example proceeds, reference being had to the accompanying drawings in which FIG. 1 is a schematic top view onto the production plant;

FIG. 5 is a partially sectional view of the transfer station and of a part of the rocker drier.

The illustrated and described example of a plant according to the invention serves the purpose of producing ceramic pots, especially flower pots.

Figure 1:
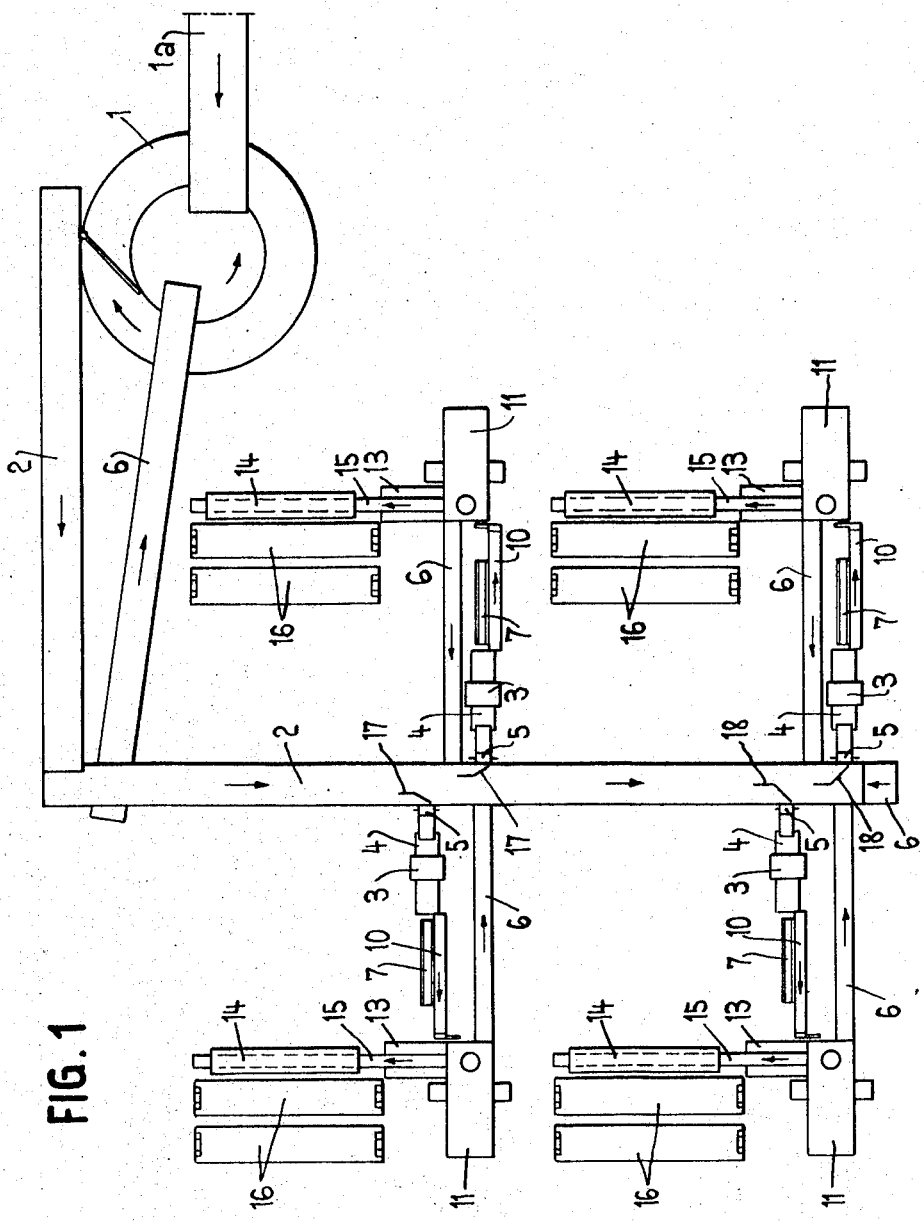
Figure 2:
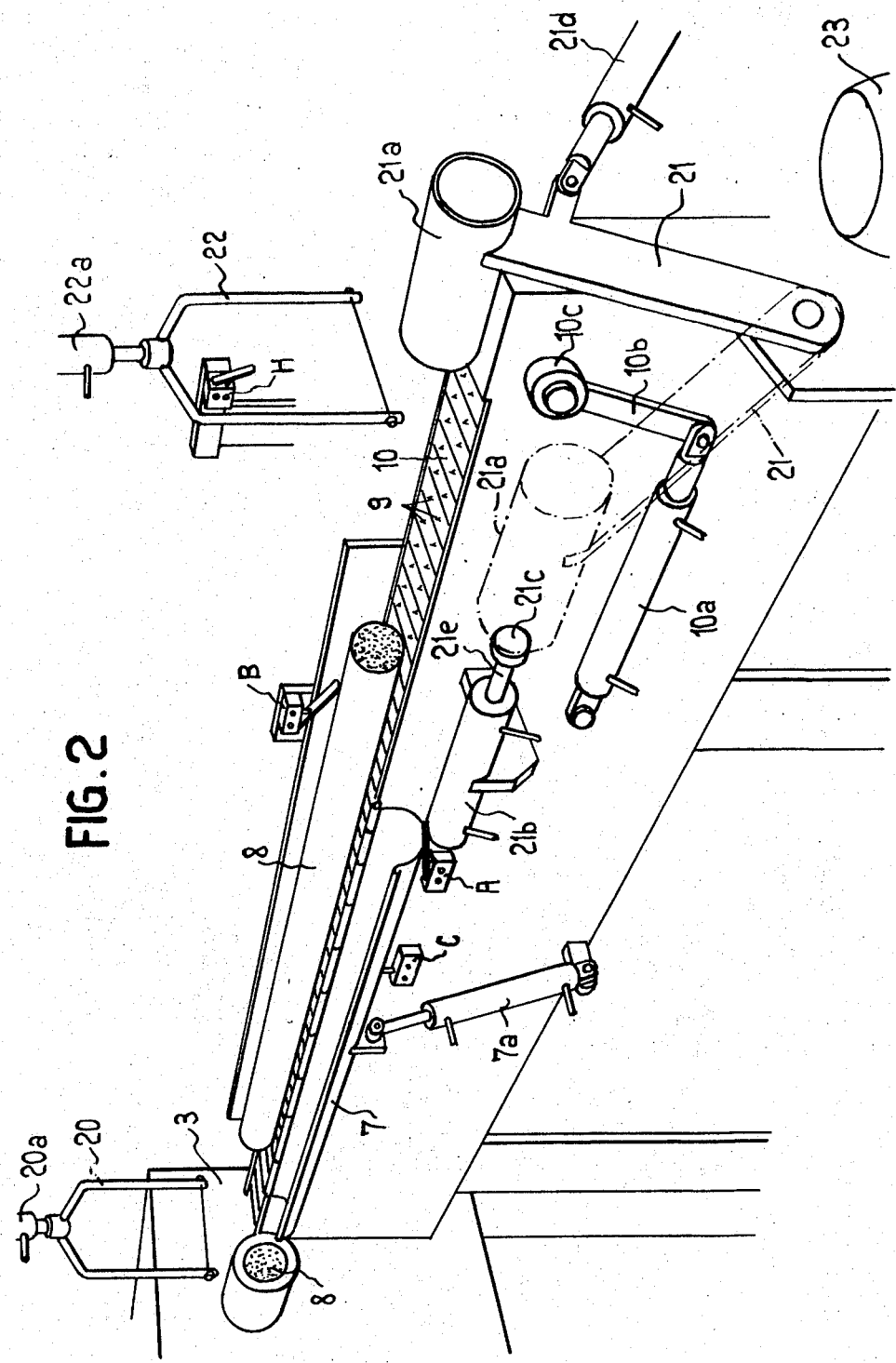
FIG. 2 shows on a larger scale details of an automatic press-charging equipment.

FIG. 1 shows schematically a centrifugal mixer 1 with the automatic band-charger 1a for feeding the mixer 1. Conveyer-bands 2 go out from the mixer 1. The arrows on these bands indicate the direction of movement of the conveyed material to be pressed. There are also four extruder- or vacuum presses 3 with the storage bunkers 4 belgonging to them, as well as automatically controlled flaps 5 controlling the quantity of the raw material to be fed from the conveyer-bands 2 into the storage bunkers 4. There are also shown return-transport bands 6 for conveying material in excess back to the centrifugal mixer 1; one of these return-transport bands 6 lying beneath a conveyer-band 2, but moving in opposite direction to the latter. In FIG. 1 and in detail in FIG. 2 are shown tipping devices 7, onto which the rather long rod-shaped pre-pressed blanks 8 (FIG. 2) produced by the extruder-presses 3 are brought before they are tipped onto the band 10 provided with prominences or cams 9 (FIG. 2). The conventional presses 11 with their delivery devices 13 sequence-controlled by the upper part 12 of the presses (FIG. 3) are only schematically illustrated, as well as the transfer stations 14, the bands 15 moved forward in the rhythm of the forming presses 11, and the rocker driers 16.

The working manner of the described and illustrated plant will be understood by the following description with reference to FIGS. 1 to 6:

The ceramic raw material is automatically brought by the band charger 1a into the centrifugal mixer 1 which the raw material leaves in the shape of crumbs or lumps and is moved away by the conveyor-bands 2. From the conveyor-band 2 which, in FIG. 1, runs along the extruder presses 3, the crumbled material is led into the storage bunkers 4 by means of suitably arranged baffle plates 17 and 18 and the flaps 5. The baffle plates 17 are, for instance, disposed in such a way, that they deviate towards the flaps 5 the crumbled material which lies on the outer quarters of the width of the band 2, while the baffle plates 18 lead the remaining material lying in the middle portion of the width of the band 2 to the flaps 5 at the bottom in FIG. 1 and thereby to the extruder-presses 3 belonging to these lower flaps 5. Since the quantity of crumbled material fed on the conveyor-bands 2 is greater than the quantity necessary to guarantee continuous production even at an unfavourable distribution of the crumbled material on the conveyor-bands 2, the flaps 5 are mounted to be swung in such a way that the material coming from the conveyor-band 2 lying on the high level, is led, according to the working conditions of the extruder-presses 3, either into the storage bunkers 4 or to the return-transport band 6 lying at a lower level. Due to this arrangement it is possible that each single extruder-press 3 can produce differently thick prepressed blanks without that the continuos production is impaired thereby.

Figure 4:
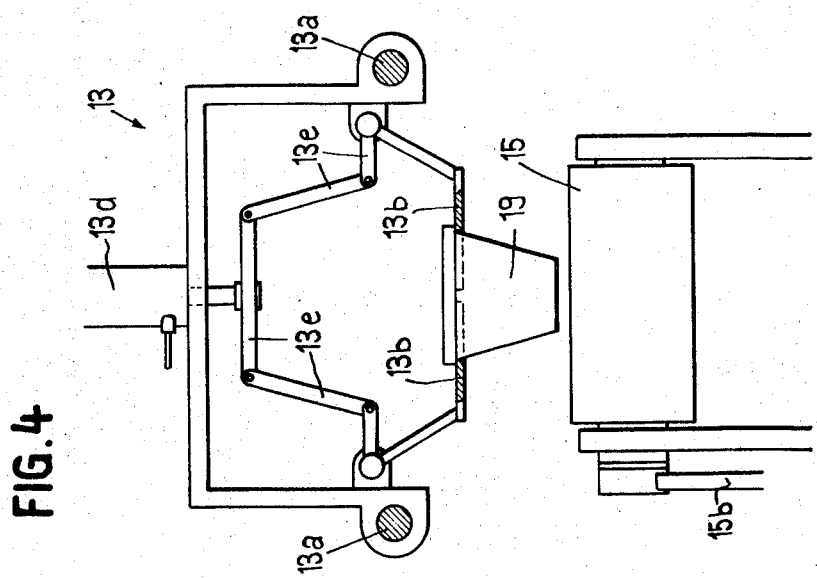
FIG. 4 illustrates a detail of the delivery device according to FIG. 3.
Figure 3:
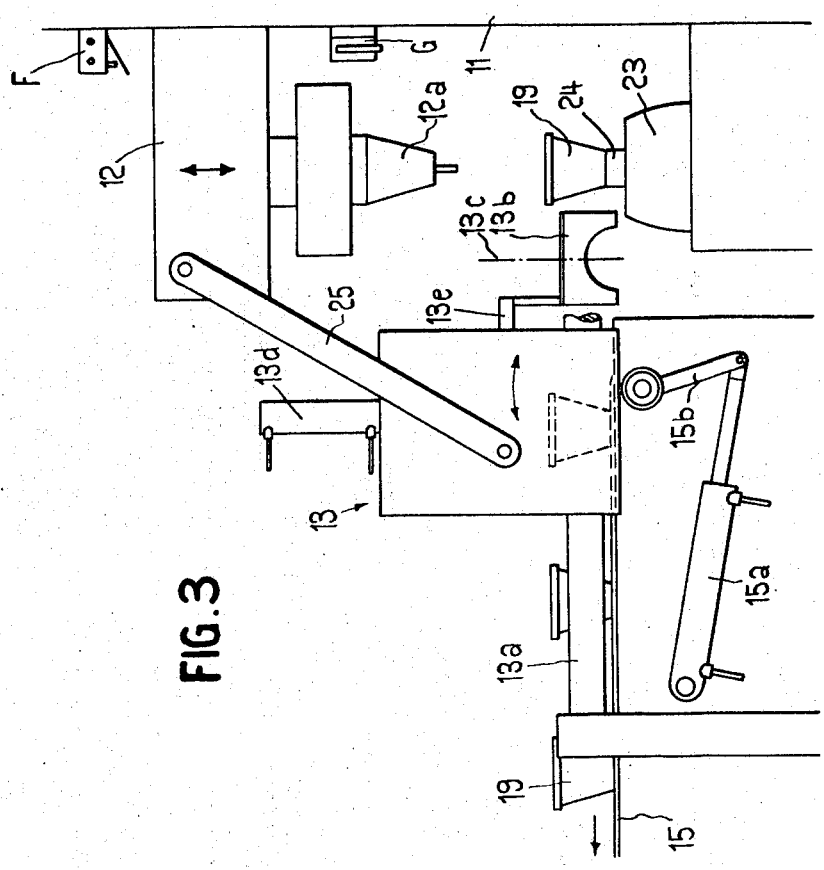
FIG. 3 is a side view of the delivery device.

In order to guarantee the continuity of the production at each press 3, the pre-pressed blanks brought into the presses 11 contain also a larger quantity of material than is necessary for the production of the finished product 19 (FIG. 3 and 4). The surplus of material expelled during pressing is returned to the centrifugal mixer 6 by the return-bands 6 which begin at the forming or molding presses 11. Thereby the entire production plant works practically without waste.

Figure 6:
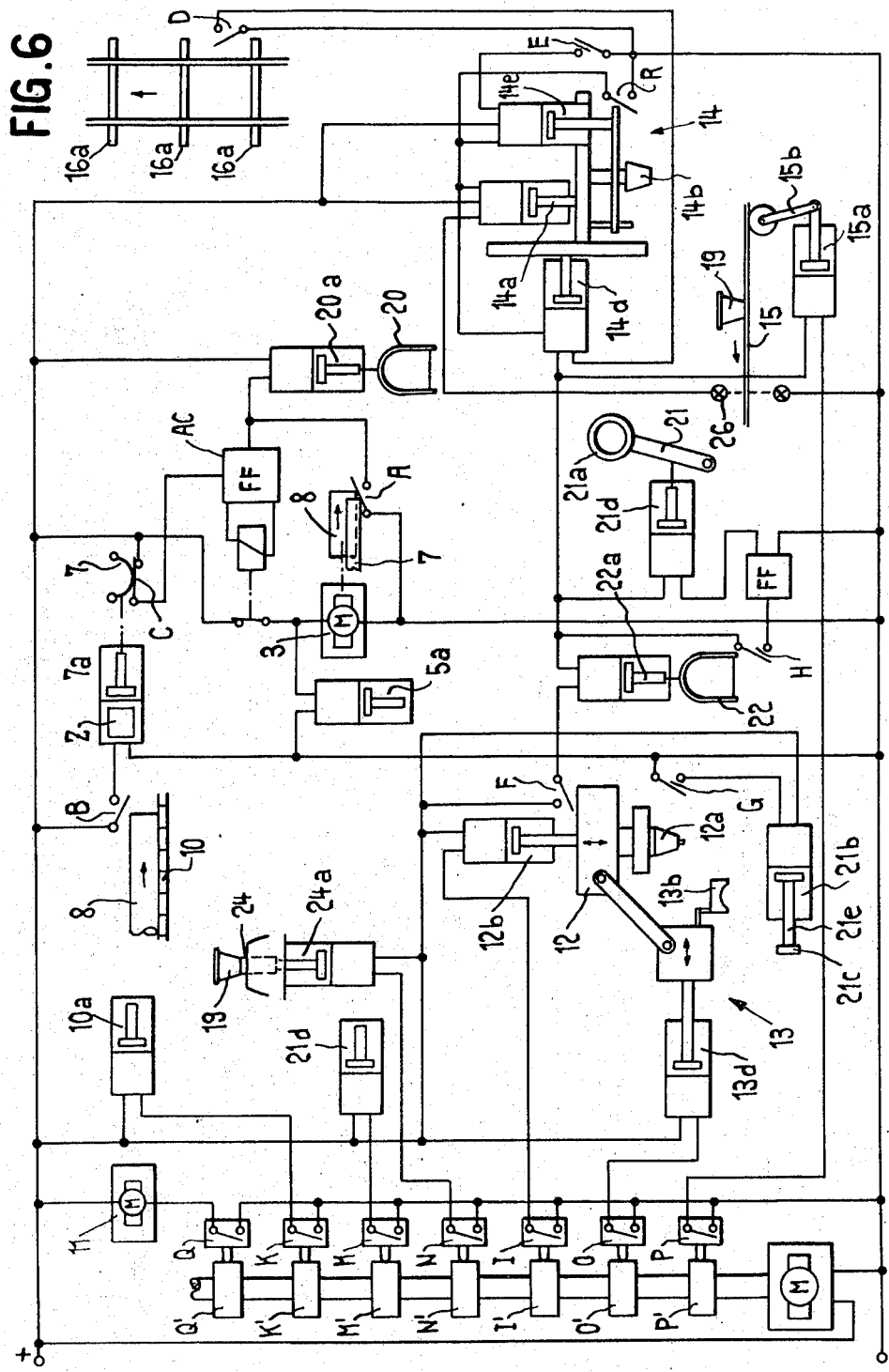
FIG. 6 is a diagram of the control system of the entire production plant.

After the material to be treated, which has been branched off from the conveyor-band 2, has reached the storage bunkers 4, it is pressed in the extruder-presses into the shape of the rod-shaped blanks 8 (FIG. 2). These blanks 8 are, as shown in FIG. 2, pushed onto the tipping or tilting devices 7. During this process the extruder-presses 3 work so long until the blanks 8 protruding from them close at the end of the tipping devices 7 the associated switches A (FIGS. 2 and 6). As soon as the extruder-presses 3 are cut off by operating these switches A, the blanks 8 are severed by cutting devices 20 of well-known structure (leftside of FIG. 2). For this operation, the cutting devices 20 with their pistons 20a (FIGS. 2 and 6) are controlled by the switches, as are the extruder-presses 3 and the associated flaps 5 or their control cylinders 5a (FIG. 6) respectively. In the example shown, the operation of the switch A cuts off the associated extruder-press through a flip-flop AC (FIG. 6) and a relay, brings the cylinder 5a into its other end position and lowers the cutting device 20. Since, as described, the blanks 8 leaving the extruder-press 3 start the cutting device when they reach the switch A, they always have an alloted length. These blanks lying on the correspnding tipping devices 7 remain there until the preceding blanks 8 lying on the bands 10 provided with the prominences 9 (FIG. 2) are advanced by the latter until the switch B (FIG. 6) provided on each press-charging equipment is changed-over, which only occurs when the blank 8 lying on the band 10 is advanced by the latter far enough to allow an undisturbed turning of the blank 8 lying on the tipping device 7 over to the band 10. By the changing-over of the switch B the cylinder 7a (FIGS. 2 and 6) of the tipping device 7 is operated so that the above-mentioned turning-over of the blank 8 from the tipping device 7 to the band 10 is carried out. After this turning-over proceeding the tipping device 7, which is controlled by a delay unit Z (FIG. 6), takes again the position shown in FIG. 2, so that the temporarily opened switch C (FIG. 6) is again closed and thereby, through the flip-flop AC (FIG. 6) controllable by switching-in the switch C, switches-in, on the one hand, the extruder press 3 and, on the other hand, brings the flap 5 by means of the cylinder 5a again into the position in which the material deviated by the baffle plates 7 is led into the storage bunkers 4. As seen in FIG. 6, the cutting device 20, however, is not brought back into its starting position by the switch C, but by the releasing of the switch A during the turning-over proceeding.

The two above-mentioned switches A and B must be adjusted in such a way that, after the turning-over of the blank 8 lying on the tipping device 7 onto the band 10, the face of this blank 8 comes to lie as near as possible to the hind face of the preceding blank 8. It is clear that the blanks 8 when expelled by the extruder presses 3 must have a greater feeding speed than the blanks on the bands 10.

The automatic press-charging equipment as shown in FIG. 2 comprises the following essential components whose working manner follows in part already from the above description: the tipping device 7 with the cylinder 7a operating it, the band 10 with the prominences 9, the band 10 advancing step by step in the rhythm of the press, this band being driven by the cylinder 10a through the intermediary of the lever 10b and the free-wheel-coupling 10c, the proper press-charging equipment comprising a tube piece 21a arranged on a tiltable lever 21 and a throwing-in cylinder 21b with a disc-shaped piston-rod head 21c, as well as the cylinder 21d controlling the lever 21. The second cutting device 22 (at the right in FIG. 2) subdividing the long blanks 8 advanced by the band 10 into shorter blanks of prescribed length and dimensions, which are to be brought or thrown into the lower press-part 23, also belongs to the press-charging equipment. As follows especially from FIG. 6, besides the presses 11 themselves, also the cylinders 10a and 21d of the press-charging equipment are controlled by a cam steering (on the left in FIG. 6). The cylinder 10a is controlled by a switch K and the cylinder 21d by a switch H through a flip-flop. The cylinder 21b, however, is controlled by a switch G fixed to the press 11. The press 11 itself is switched-in and cut-off by a switch Q of the cam steering. The mutual adjustment of the various cams Q', K', M' and L', as well as that of the further cams N', I', O' and P' of the cam steering whose functions will be described later-on, is chosen in accordance with the desired sequence of operation.

The operation manner of the press-charging equipment is essentially as follows:

The blank portion inserted into the tube piece 21a by the step by step advance movement of the band 10 is severed from the remaining part of the blank by means of the second cutting equipment 22, whereupon the cylinder 21d brings the lever 21 and the tube piece 21a fixed thereto into the position indicated by chain-dotted lines in FIG. 2. As shown in FIG. 6, the cutting device 22 or its cylinder 22a respectively is controlled by a switch F arranged on the forming or molding press 11. This switch is operated, when the upper press-part 12 is brought into the extreme upper position by means of the cylinder 12b controlled by the cam steering or its switch I respectively. On the downward movement of the upper press-part 12 the switch G (FIG. 3), as above described, is operated, whereby the cylinder 21b is switched-in and throws the blank portion contained in the tube piece 21a into the lower press-part 23 (FIG. 3). Afterwards, the pressing proceeding to form the workpiece 19 is executed in the usual manner, wherupon the upper press-part 12 (FIG. 3) gives the lower press-part 23 free and the finished formed production 19 (FIG. 3) is removed by the delivery device 13. The push rod 24 (FIG. 3) lifted for this purpose is then withdrawn and the upper press-part 12 moved upward.

Meanwhile and caused by the cam steering the unit 21, 21a has been returned to its starting position in order to receive the next blank. The working rhythm of each of these press-charging equipments and of the press 11 following this equipment is, as described above, determined by an associated cam steering so that the production groups 3, 7, 11, 13 etc. of the described embodiment of the invention can work completely independent from one another.

The forming of the blank in the lower press-part 23 takes place in a known manner since the forming presses 11 work in a conventional manner, i.e., the lower press-part 23 is immovable, while the upper press-part 12 with the rotatable punch 12a (FIG. 3) is movable. When the forming of the work-piece, such as a ceramic piece, e.g. a flower pot 19 has been completed, the push rod 24 lifts the completed piece 19 out of the lower press-part 23 by means of a cylinder 24a operated by a switch N (FIG. 6) controlled by the cam steering (FIGS. 3 and 6).

As illustrated in FIG. 3, the upper press-part 12 is connected with the delivery device 13 by means of one, two or more levers 25 whose length is adjustable. This is the case in each production group 3, 7, 11, 13 etc. This interconnection of the members 12 and 13 allows, after completed forming of the workpiece 19, of drawing on the slide rails 13a the delivery device 13 by the upward movement of the upper press-part 12 so close to the workpiece 19 that the axes 13c of the two grippers 13b are exactly in line with the axis of the workpiece 19, provided of course, that the lever 25 is adjusted correctly. At this moment, the cylinder 13d is operated by the switch so that the grippers 13b are brought by means of the rods 13e into the position shown in FIG. 4. Thereby the workpiece 19 is easily lifted from the push rod 24 without being damaged, provided, of course, that the shape of the grippers 13b is correct.

After this working step, the push rod (FIG. 3) is moved inwards by means of the cylinder 24a operated by the switch of the cam steering, whereupon the cycle begins again. Due to the downward movement of the upper press-part 12, the delivery device 13 together with the workpiece 19 held in the grippers 13b is automatically pushed backward through the intermediary of the levers 25, and this so far until the workpiece 19 arrives above the band 15 (FIGS. 3 and 4) which is moved forward step by step by means of the lever 15b and the cylinder 15a operated by the switch P of the cam steering. Now the cylinder 13d operated by the switch O begins again to move so that the grippers 13b, connected with the cylinder 13d by means of the rods 13e, are again opened so that the formed workpiece 19, as shown in dotted lines in FIG. 3, is deposited on the band 15. Afterwards, this band 15 is moved forward by one step by means of the cylinder 15a controlled by the switch P, in order to give free space for the next workpiece 19.

In order to increase the operation safety of the delivery device 13 or the safety of throwing the blank into the lower press-part 23 respectively, the automatic press-charging equipment 21, 21a, b, c, d and e is preferably adjusted in such a way that the piston 21e does not move forward until the delivery device 13 with the workpiece 19 has been moved backward between the grippers 13b so far that the workpiece 19 is already outside the lower press-part 23.

The workpieces 19 disposed on the band 15 at a determined distance from one another are moved forward step by step until the faremost workpiece 19 reaches the light barrier 26 (FIG 5) disposed at the end of the band 15. As soon as the light ray of this barrier 26, which serves as a switch, is interrupted by a workpiece 19 the working cycle of the transfer station 14 (FIG. 5) is started. In the described embodiment it is the question of the following cycle: By the cylinder 14a controlled by the light barrier 26 the carrier 14c carrying the transfer members 14b is moved downward until the transfer member or members 14b lie in the workpieces 19 disposed beneath it or them, as is illustrated in FIG. 5. Then the carrier 14c, under the effect of the cylinder 14a, is lifted so far that the workpieces 19 are completely removed from the band 15. Afterwards the cylinder 14, by the rocker drier 16 closing the switch D (FIGS. 5 and 6), begins to operate so that the entire transfer station 14 is pushed towards the rocker drier (FIG. 5). This movement lasts until the workpieces 19 hanging on the transfer members 14b arrive above a swing 16a of the continuously moving rocker drier 16. Thereby the switch E (FIGS. 5 and 6) is operated with the effect that the cylinder 14e begins to operate in such a way that the stripper 14f is moved downward to such an extent that the workpieces 19 are stripped off the transfer members 14b. Thereafter, the transfer station 14 is brought back into the starting position by means of the members 14d, 14e and 14a, this movement being started by the switch R (FIG. 6) acting on all cylinders.

Depending on the dimensions of the workpieces 19, the transfer station 14 is conceived in such a way that several transfer members 14b can be disposed in one or several rows.

Due to the fact that by the transfer station 14 several workpieces 19 are at the same time transferred to the rocker drier 16, the latter is better utilised and time can be gained for the entire working cycle of the transfer station 14 so that a maximum production of the single production groups 3, 7, 11, 13 etc is obtained.

Many modifications of the described embodiment for the production of ceramic or other workpieces may be necessary by the kind of the workpieces without departing from the spirit of the invention.

The control of all the cylinders and other units, even of the entire plant may be electrical, pneumatic or hydraulic. Even a combination of those systems is possible. For all these kinds of control the diagram of FIG. 6 may in principle be used, with the condition, of course, that the schematically illustrated components of the plant are replaced by corresponding electrical, pneumatic or hydraulic components.

Instead of flower pots any other kinds of ceramic or non-ceramic workpieces may be produced, and another number of production groups 3, 7, 11, 13 etc. may be provided in the plant.

Due to the plant according to the invention larger and cheaper quantities can be produced with a smaller staff of workers.

I claim:

1. An automatic production plant for forming workpieces, for instance, ceramic workpieces, comprising an automatically fed centrifugal mixer, an automatic feeding device consisting of a conveyor-band in feeding relation with said centrifugal mixer, at least one extruder-press with an associated storage bunker, an automatic press-charging equipment following said extruder-press, a press after said press-charging equipment to receive a blank from said equipment and to form the completed workpiece, a sequence-controlled delivery device following said press, a rocker-drier, an automatically controlled transfer station between said press and said delivery device arranged to bring the formed workpieces from said press to said rocker drier, characterized by the improvement that both conveyor-bands for feeding the necessary material to be treated to said storage bunkers of said extruder-press and a return-transport-band for returning material in excess are provided, a flap to automatically control the quantity of the material fed into said storage bunker, means to give the blank formed by said extruder press a predetermined length, a sequence-controlled band arranged to move step by step, a tipping device for receiving said blank from said extruder press, means to operate said tipping device for transporting said blank onto said sequence-controlled band, said automatic press-charging equipment arranged at the end of said sequence controlled band to receive a part of the blank on said band, a cutting device in front of said press-charging equipment to cut the blank part in said equipment away from the blank part remaining on said band, said press after said press-charging equipment having an upper part and a lower part movable relatively to each other to be opened or closed, control means to operate the press-charging equipment for moving the cut-away blank part into said lower press-part on said press being open, control means to close said press to form said workpiece and to feed material in excess onto said return-transport band, a transport-band movable step by step, a delivery device in cooperation with said press to receive the completed workpieces from the opened press to bring them onto said transport-band movable step by step and a transfer station between said transport-band and said continuously movable rocker-drier to bring the completed workpiece form said transport-band to said rocker-drier.

2. An automatic production plant as claimed in claim 1, comprising at least two production groups each comprising an extruder press, a tipping device, an automatic press-charging equipment, a press after said press-charging equipment to form the workpiece, a delivery device, and a transfer station, and means controlling said groups independent from each other.

3. An automatic production plant as claimed in claim 2, said groups being so designed that workpieces of different kind can be formed in said groups.

* * * * *